United States Patent
Qiu

(10) Patent No.: US 11,336,451 B2
(45) Date of Patent: May 17, 2022

(54) CROSS-BLOCKCHAIN RESOURCE TRANSMISSION

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

(21) Appl. No.: 16/786,764

(22) Filed: Feb. 10, 2020

(65) Prior Publication Data

US 2020/0177388 A1 Jun. 4, 2020

Related U.S. Application Data

(63) Continuation of application No. PCT/CN2020/071562, filed on Jan. 11, 2020.

(30) Foreign Application Priority Data

Jun. 28, 2019 (CN) .......................... 201910577318.9

(51) Int. Cl.
*G06Q 20/40* (2012.01)
*G06Q 30/02* (2012.01)
(Continued)

(52) U.S. Cl.
CPC ........ *H04L 9/3226* (2013.01); *G06F 16/2379* (2019.01); *G06Q 20/027* (2013.01);
(Continued)

(58) Field of Classification Search
CPC .................. H04L 9/3226; H04L 9/3236; H04L 9/3247; H04L 69/32; H04L 2209/38;
(Continued)

(56) References Cited

U.S. PATENT DOCUMENTS

| 10,298,585 B1* | 5/2019 | Treat ....................... G06Q 20/02 |
| 2016/0267605 A1 | 9/2016 | Lingham et al. |
| 2017/0109735 A1* | 4/2017 | Sheng ................... H04L 9/3297 |

(Continued)

FOREIGN PATENT DOCUMENTS

| CN | 108009811 | 5/2015 |
| CN | 107301536 | 10/2017 |

(Continued)

OTHER PUBLICATIONS

Antonopoulos, A., Mastering Ethereum, Antonopoulos, Dec. 2018, First Edition, Pertinent pages: p. 1; Chapter 6: 107, 110-111, 114; Chapter 7: pp. 149, 152-156; Chapter 13, p. 299 (Year: 2018).*

(Continued)

*Primary Examiner* — John W Hayes
*Assistant Examiner* — Chenyuh Kuo
(74) *Attorney, Agent, or Firm* — Fish & Richardson P.C.

(57) ABSTRACT

Examples of a method and apparatus for cross-chain resource transmission are described. The cross-chain resource transmission includes sending from a first account of a first blockchain to another blockchain. One example of the method is executed by the first blockchain and includes: initiating, by the first account, a first transaction used for cross-chain resource transmission, to decrement a first resource balance of the first account by a first quantity and save first data obtained through a consensus into the first blockchain based on execution of the first transaction, where the first data includes an authenticable message; and sending the first data and first location information to the relay end, which is used to send the authenticable message to the second blockchain, where a second resource balance of the second account is incremented by a second quantity.

19 Claims, 8 Drawing Sheets

(51) Int. Cl.
*G06Q 20/32* (2012.01)
*G06Q 20/34* (2012.01)
*G06Q 20/38* (2012.01)
*H04L 9/32* (2006.01)
*H04B 7/15* (2006.01)
*G06F 16/23* (2019.01)
*G06Q 20/02* (2012.01)
*H04L 69/32* (2022.01)

(52) U.S. Cl.
CPC ............. *H04B 7/15* (2013.01); *H04L 9/3236* (2013.01); *H04L 9/3247* (2013.01); *G06Q 2220/00* (2013.01); *H04L 69/32* (2013.01); *H04L 2209/38* (2013.01)

(58) Field of Classification Search
CPC ........... H04L 9/00–38; H04L 69/00–40; H04L 2209/00–88; G06F 16/2379; G06F 16/00–986; H04B 7/15; H04B 7/00–2693; G06Q 2220/00–18; G06Q 20/00–425
See application file for complete search history.

(56) References Cited

U.S. PATENT DOCUMENTS

| | | | | |
|---|---|---|---|---|
| 2018/0041486 | A1* | 2/2018 | Way | H04L 67/02 |
| 2018/0096313 | A1* | 4/2018 | Chenard | G06Q 20/389 |
| 2019/0018887 | A1* | 1/2019 | Madisetti | H04L 9/3247 |
| 2020/0065763 | A1* | 2/2020 | Rosinzonsky | H04L 9/3236 |

FOREIGN PATENT DOCUMENTS

| | | |
|---|---|---|
| CN | 108288159 | 7/2018 |
| CN | 108389129 | 8/2018 |
| CN | 108415784 | 8/2018 |
| CN | 108470278 | 8/2018 |
| CN | 108683630 | 10/2018 |
| CN | 108848119 | 11/2018 |
| CN | 109035012 | 12/2018 |
| CN | 109493027 | 3/2019 |
| CN | 109639550 | 4/2019 |
| CN | 110443704 | 11/2019 |
| CN | 109412789 | 5/2020 |
| CN | 108876370 | 11/2020 |
| TW | M572512 | 1/2019 |
| TW | I663865 | 6/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report and Written Opinion in International Application No. PCT/CN2020/071562, dated Apr. 13, 2020, 15 pages (with partial machine translation).

* cited by examiner

CROSS-BLOCKCHAIN RESOURCE TRANSMISSION

CROSS-REFERENCE TO RELATED APPLICATIONS

This application is a continuation of PCT Application No. PCT/CN2020/071562, filed on Jan. 11, 2020, which claims priority to Chinese Patent Application No. 201910577318.9, filed on Jun. 28, 2019, and each application is hereby incorporated by reference in its entirety.

TECHNICAL FIELD

Embodiments of the present disclosure relate to the field of blockchain technologies, and more specifically, to a method and apparatus for cross-chain resource transmission.

BACKGROUND

Blockchain technology is also referred to as the distributed ledger technology, which is a decentralized distributed database technology characterized by decentralization, openness, transparency, tamper resistance, and trustworthiness. Each piece of data in a blockchain can be broadcast to blockchain nodes on an entire network. As such, each full node has full and consistent data. Popularity of the blockchain technology is accompanied with emergence of various types of chains that are applied to fields such as finance, health care, supply chain, asset management, and source tracing. However, most on-chain applications (cryptocurrency or smart contracts) do not cross a boundary of a current chain, and do not coordinate or cooperate with other chains to implement circulation of values. Therefore, a blockchain has limited room to play. Currently, a plurality of cross-chain technologies have emerged. However, each cross-chain technology has its unique design. One chain may need to access a plurality of cross-chain platforms for cross-chain resource transmission between different chains.

SUMMARY

Embodiments of the present disclosure are intended to provide an effective cross-chain resource transmission.

To achieve the preceding objective, one aspect of the present disclosure provides a method for cross-chain resource transmission. The cross-chain resource transmission includes sending from a first account of a first blockchain to another blockchain. The first blockchain is connected to a relay end. The relay end is further connected to at least one another blockchain. The at least one another blockchain includes a second blockchain. The first blockchain uses a first resource as an exchangeable resource. The second blockchain uses a second resource as an exchangeable resource. The method is executed by the first blockchain and includes the following: initiating, by the first account, a first transaction used for cross-chain resource transmission, to decrement a first resource balance of the first account by a first quantity; saving first data obtained through a consensus into the first blockchain based on execution of the first transaction, where the first data includes an authenticable message, and where the authenticable message includes at least the following fields satisfying a predetermined protocol: a sending blockchain identifier field, a sending account field, a receiving blockchain identifier field, a receiving account field, and a message content field, where the sending blockchain identifier field, the sending account field, the receiving blockchain identifier field, the receiving account field, and the message content field respectively correspond to the following field values: a first blockchain identifier, the first account, a second blockchain identifier, a second account, and the first quantity; and sending the first data and first location information to the relay end, which is used to send the authenticable message to the second blockchain, where a second resource balance of the second account is incremented by a second quantity, where the second quantity is calculated based on the first quantity and a conversion ratio between the first resource and the second resource, and where the first location information indicates a location of the first data in the first blockchain.

In an embodiment, the first transaction includes invoking of a first smart contract. The first transaction introduces at least the following parameters into the first smart contract when invoking the first smart contract: the second blockchain identifier, the second account, and the first quantity. Saving the first data obtained through the consensus into the first blockchain includes saving the first data obtained through the consensus into the first blockchain through execution of the first smart contract.

In an embodiment, the first transaction includes invoking of a second smart contract. The first transaction introduces at least the following parameters into the second smart contract when invoking the second smart contract: the second blockchain identifier, the second account, and the first quantity. The second smart contract includes invoking of the first smart contract. The second smart contract introduces at least the following parameters into the first smart contract when invoking the first smart contract: the first account, the second blockchain identifier, the second account, and the first quantity. Decrementing the first resource balance of the first account by the first quantity includes decrementing the first resource balance of the first account by the first quantity through execution of the second smart contract.

In an embodiment, the first data is labeled with a predetermined flag.

In an embodiment, the first data is a receipt corresponding to the first transaction. The receipt includes a log generated after the first smart contract is executed, and a data field in the log is the authenticable message.

In an embodiment, the authenticable message satisfies a predetermined protocol stack. The predetermined protocol stack includes a first layer protocol to a third layer protocol from outside in. The first layer protocol includes the sending blockchain identifier field and the second layer protocol. The second layer protocol includes the sending account field and the third layer protocol, and the third layer protocol includes the receiving blockchain identifier field, the receiving account field, and the message content field.

In an embodiment, the first layer protocol further includes a protocol version number field and a reserved field.

In an embodiment, the second layer protocol further includes a type field. The type field indicates a type of an application of the authenticable message.

In an embodiment, the third layer protocol further includes a sequence number field that indicates a current sending sequence number when the first account sends resources to the second account for multiple times.

In an embodiment, the authenticable message satisfies a predetermined protocol stack. The predetermined protocol stack includes a first layer protocol to a third layer protocol from outside in. The first layer protocol includes the sending blockchain identifier field, the receiving blockchain identifier field, and the second layer protocol. The second layer protocol includes the sending account field, the receiving account field. The third layer protocol, and the third layer protocol includes the message content field.

In an embodiment, the method further includes the following: after the first resource balance of the first account is decremented by the first quantity, sending, by a first blockchain platform, the first quantity of first resources to a second blockchain platform based on a predetermined protocol agreed on with the second blockchain.

Another aspect of the present disclosure provides a method for cross-chain resource reception. The cross-chain resource reception includes receiving by a second account of a second blockchain from another blockchain. The second blockchain is connected to a relay end. The second blockchain synchronizes at least one piece of second data separately related to at least one another blockchain through the relay end. The at least one another blockchain includes a first blockchain. The first blockchain uses a first resource as an exchangeable resource. The second blockchain uses a second resource as an exchangeable resource. The method is executed by the second blockchain and includes the following: receiving, from the relay end, first data and first location information, where the first data includes an authenticable message, where the authenticable message includes at least the following fields satisfying a predetermined protocol: a sending blockchain identifier field, a sending account field, a receiving blockchain identifier field, a receiving account field, and a message content field, where the sending blockchain identifier field, the sending account field, the receiving blockchain identifier field, the receiving account field, and the message content field respectively correspond to the following field values: a first blockchain identifier, a first account, a second blockchain identifier, the second account, and a first quantity, and where the first location information indicates a location of the first data in a sending blockchain; obtaining second data related to the first blockchain and a conversion ratio between the first resource and the second resource based on the first blockchain identifier in the authenticable message; verifying the authenticable message based on the first data, the second data related to the first blockchain, and the first location information; and initiating, by a local account and based on the second account in the authenticable message after the verification succeeds, a second transaction used for cross-chain resource reception, to increment a second resource balance of the second account by a second quantity based on execution of the second transaction, where the second quantity is calculated based on the first quantity and the conversion ratio.

In an embodiment, the first data is a first receipt in a first block of the first blockchain. The first location information includes a block serial number of the first block and a receipt serial number of the first receipt in the first block. The second data related to the first blockchain is a block header of each block in the first blockchain. Verifying the authenticable message based on the first data, the second data related to the first blockchain, and the first location information includes performing verification through a simple payment verification method based on the first receipt, the block header of each block, and a Merkle tree path associated with the first receipt in the first block. The first receipt comes from the first block in the first blockchain. The Merkle tree path is obtained based on the first location information.

In an embodiment, verifying the authenticable message based on the first data, the second data related to the first blockchain, and the first location information further includes verifying, based on a sending field of the first receipt, that the first account is an account that sends the authenticable message.

In an embodiment, the second transaction invokes a third smart contract. Incrementing the second resource balance of the second account by the second quantity based on execution of the second transaction includes incrementing the second resource balance of the second account by the second quantity based on execution of the third smart contract.

Another aspect of the present disclosure provides an apparatus for cross-chain resource transmission. The cross-chain resource transmission includes sending from a first account of a first blockchain to another blockchain. The first blockchain is connected to a relay end. The relay end is further connected to at least one another blockchain. The at least one another blockchain includes a second blockchain. The first blockchain uses a first resource as an exchangeable resource. The second blockchain uses a second resource as an exchangeable resource. The apparatus is deployed in the first blockchain and includes the following: a transaction initiation unit, configured to enable the first account to initiate a first transaction used for cross-chain resource transmission, to decrement a first resource balance of the first account by a first quantity and save first data obtained through a consensus into the first blockchain based on execution of the first transaction, where the first data includes an authenticable message, and where the authenticable message includes at least the following fields satisfying a predetermined protocol: a sending blockchain identifier field, a sending account field, a receiving blockchain identifier field, a receiving account field, and a message content field, where the sending blockchain identifier field, the sending account field, the receiving blockchain identifier field, the receiving account field, and the message content field respectively correspond to the following field values: a first blockchain identifier, the first account, a second blockchain identifier, a second account, and the first quantity; and a provision unit, configured to send the first data and first location information to the relay end, to send the authenticable message to the second blockchain, where a second resource balance of the second account is incremented by a second quantity, where the second quantity is calculated based on the first quantity and a conversion ratio between the first resource and the second resource, and where the first location information indicates a location of the first data in the first blockchain.

In an embodiment, the first transaction includes invoking of a first smart contract. The first transaction introduces at least the following parameters into the first smart contract when invoking the first smart contract: the second blockchain identifier, the second account, and the first quantity. The transaction initiation unit is further configured to save the first data obtained through the consensus into the first blockchain through execution of the first smart contract.

In an embodiment, the first transaction includes invoking of a second smart contract. The first transaction introduces at least the following parameters into the second smart contract when invoking the second smart contract: the second blockchain identifier, the second account, and the first quantity. The second smart contract includes invoking of the first smart contract. The second smart contract introduces at least the following parameters into the first smart contract when invoking the first smart contract: the first account, the second blockchain identifier, the second account, and the first quantity. The transaction initiation unit is further configured to decrement the first resource balance of the first account by the first quantity through execution of the second smart contract.

In an embodiment, the apparatus further includes a sending unit, configured to enable, after the first resource balance of the first account is decremented by the first quantity, a first blockchain platform to send the first quantity of first resources to a second blockchain platform based on a predetermined protocol agreed on with the second blockchain.

Another aspect of the present disclosure provides an apparatus for cross-chain resource reception. The cross-chain resource reception includes receiving by a second account of a second blockchain from another blockchain. The second blockchain is connected to a relay end. The second blockchain synchronizes at least one piece of second data separately related to at least one another blockchain through the relay end. The at least one another blockchain includes a first blockchain. The first blockchain uses a first resource as an exchangeable resource. The second blockchain uses a second resource as an exchangeable resource. The apparatus is deployed in the second blockchain and includes the following: a receiving unit, configured to receive, from the relay end, first data and first location information, where the first data includes an authenticable message, the authenticable message includes at least the following fields satisfying a predetermined protocol: a sending blockchain identifier field, a sending account field, a receiving blockchain identifier field, a receiving account field, and a message content field, where the sending blockchain identifier field, the sending account field, the receiving blockchain identifier field, the receiving account field, and the message content field respectively correspond to the following field values: a first blockchain identifier, a first account, a second blockchain identifier, the second account, and a first quantity, and where the first location information indicates a location of the first data in a sending blockchain; an acquisition unit, configured to obtain second data related to the first blockchain and a conversion ratio between the first resource and the second resource based on the first blockchain identifier in the authenticable message; a verification unit, configured to verify the authenticable message based on the first data, the second data related to the first blockchain, and the first location information; and a transaction initiation unit, configured to enable, based on the second account in the authenticable message after the verification succeeds, a local account to initiate a second transaction used for cross-chain resource reception, to increment a second resource balance of the second account by a second quantity based on execution of the second transaction, where the second quantity is calculated based on the first quantity and the conversion ratio.

In an embodiment, the first data is a first receipt in a first block of the first blockchain. The first location information includes a block serial number of the first block and a receipt serial number of the first receipt in the first block. The second data related to the first blockchain is a block header of each block in the first blockchain. The verification unit is further configured to perform verification through a simple payment verification method based on the first receipt, the block header of each block, and a Merkle tree path associated with the first receipt in the first block. The first receipt comes from the first block in the first blockchain. The Merkle tree path is obtained based on the first location information.

In an embodiment, the verification unit is further configured to verify, based on a sending field of the first receipt, that the first account is an account that sends the authenticable message.

In an embodiment, the second transaction invokes a third smart contract. The transaction initiation unit is further configured to increment the second resource balance of the second account by the second quantity based on execution of the third smart contract.

Another aspect of the present disclosure provides a computer-readable storage medium. The computer-readable storage medium stores a computer program, and when the computer program is run on a computer, the computer is enabled to perform the method according to any one of the preceding embodiments.

Another aspect of the present disclosure provides a computing device, including a memory and a processor. The memory stores executable code, and when executing the executable code, the processor implements the method according to any one of the preceding embodiments.

According to an abstract blockchain interoperability model in the cross-chain solutions in the embodiments of the present disclosure, an authenticable message is designed, so that a message sent by a blockchain can be authenticated by another chain, that is, it can be determined which chain the message is from and which identity entity (account/contract) on the chain sends the message. As such, cross-chain resource circulation can be allowed based on the authenticable message, and developers can more easily develop various cross-chain services and applications.

BRIEF DESCRIPTION OF DRAWINGS

The embodiments of the present disclosure are described with reference to the accompanying drawings so that the embodiments of the present disclosure can be clearer.

DESCRIPTION OF EMBODIMENTS

The following describes the embodiments of the present disclosure with reference to the accompanying drawings.

Figure 1:
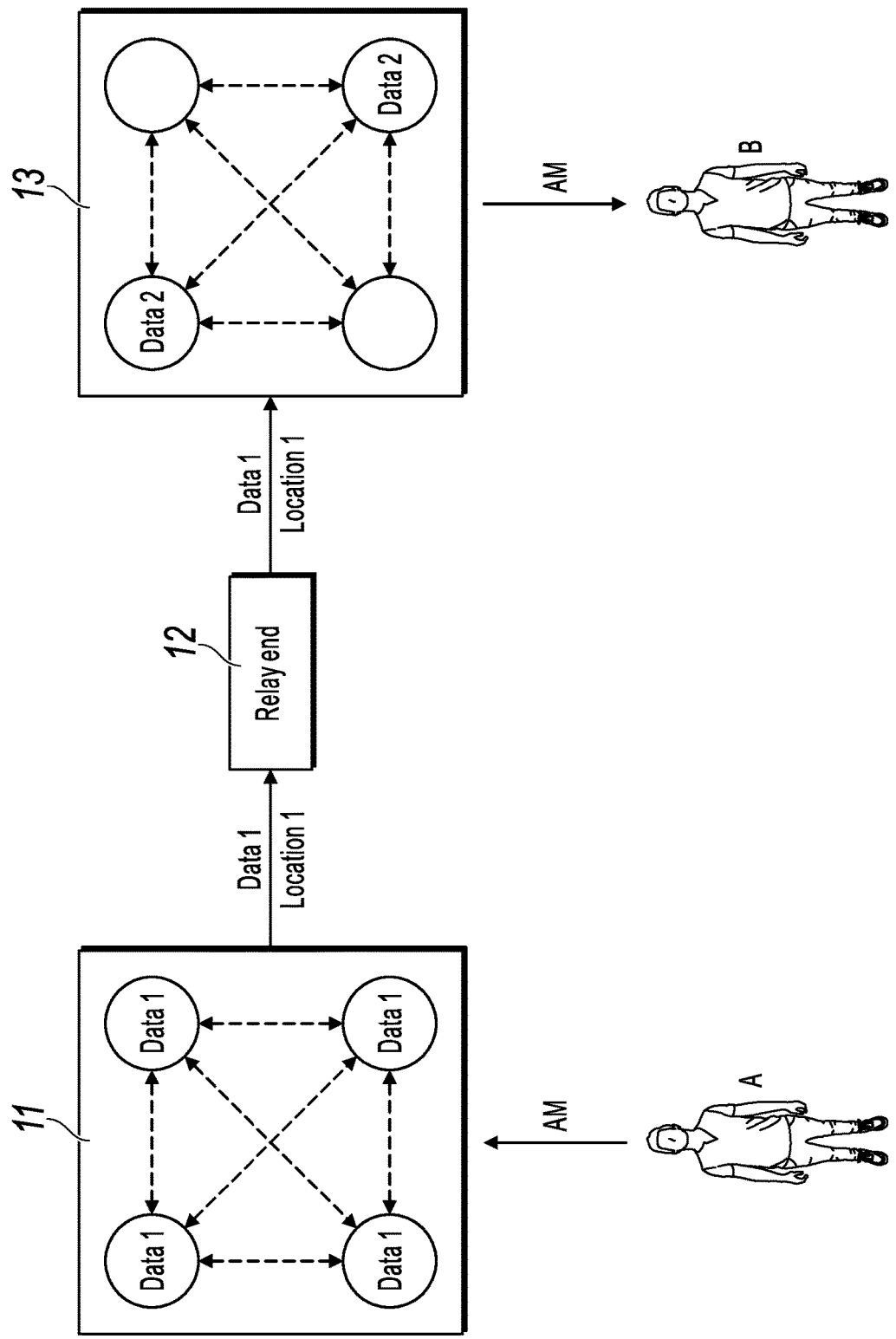
FIG. 1 is a schematic diagram illustrating a cross-chain system, according to an embodiment of the present disclosure.

FIG. 1 is a schematic diagram illustrating a cross-chain system, according to an embodiment of the present disclosure. As shown in FIG. 1, the cross-chain system includes a first blockchain 11, a relay end 12, and a second blockchain 13. For example, the first blockchain 11 includes account A, the second blockchain 13 includes account B, and account A and account B are both user accounts. When account A in the first blockchain wants to perform transfer to account B in the second blockchain, account A can perform the transfer with help of an authenticable message (AM). Specifically, account A initiates a first transaction used for cross-chain transfer so that a balance of account A is decremented by a transfer quantity, and first data (data 1 shown in the figure) is saved into the first blockchain. The quantity is a quantity of exchangeable resources (for example, tokens) in the first blockchain. The first data includes the authenticable message. The second blockchain 13 can include, for example, a plurality of simple payment verification (SPV) nodes, and the nodes can locally pre-obtain second data (data 2) in the first blockchain 11. Data 2 is used for verifying data 1. The SPV nodes can obtain the first data (data 1) and location information (location 1) of the first data through forwarding of the relay end 12 between the first blockchain 11 and the second blockchain 13, use data 2 to verify data 1, and initiate, based on the AM after the verification succeeds, a second transaction used for cross-chain transfer receiving, so as to increment a balance of account B by a quantity corresponding to the transfer quantity.

Understandably, the preceding description with reference to FIG. 1 is merely schematic and is not intended to limit the embodiments of the present disclosure. For example, after obtaining data 1, the relay end can verify data 1 based on the pre-obtained data 2 in the first blockchain and perform a digital signature, and send data 1 to the second blockchain. The second blockchain can verify the digital signature based on a public key of the relay end thereby verifying data 1.

The following describes the preceding process.

Figure 2:
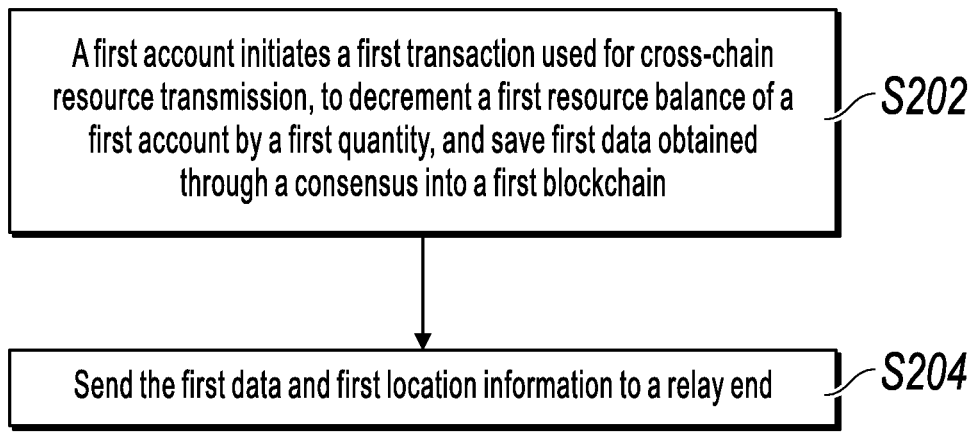
FIG. 2 is a schematic flowchart illustrating a method for cross-chain resource transmission, according to an embodiment of the present disclosure.

FIG. 2 is a schematic flowchart illustrating a method for cross-chain resource transmission, according to an embodiment of the present disclosure. The cross-chain resource transmission includes sending from a first account of a first blockchain to another blockchain. The first blockchain is connected to a relay end, the relay end is further connected to at least one another blockchain, and the at least one another blockchain includes a second blockchain. The first blockchain uses a first resource as an exchangeable resource, the second blockchain uses a second resource as an exchangeable resource. The method is executed by the first blockchain and includes the following steps:

Step S202: The first account initiates a first transaction used for cross-chain resource transmission, to decrement a first resource balance of the first account by a first quantity and save first data obtained through a consensus into the first blockchain based on execution of the first transaction. The first data includes an authenticable message, and the authenticable message includes at least the following fields satisfying a predetermined protocol: a sending blockchain identifier field, a sending account field, a receiving blockchain identifier field, a receiving account field, and a message content field. The sending blockchain identifier field, the sending account field, the receiving blockchain identifier field, the receiving account field, and the message content field respectively correspond to the following field values: a first blockchain identifier, the first account, a second blockchain identifier, a second account, and the first quantity.

Step S204: Send the first data and first location information to the relay end, which is used to send the authenticable message to the second blockchain, so that a second resource balance of the second account is incremented by a second quantity. The second quantity is calculated based on the first quantity and a conversion ratio between the first resource and the second resource, and the first location information indicates a location of the first data in the first blockchain.

In some embodiments of the present disclosure, the first blockchain and the second blockchain each can be any blockchain, for example, a bitcoin chain or an Ethereum chain, and can transfer information through an authenticable message in a uniform format. Therefore, a type of a blockchain is not specifically limited in the embodiments of the present disclosure. The relay end is middleware connected between the first blockchain and the second blockchain. The relay end can have multiple forms. For example, the relay end can be a node in both the first blockchain and the second blockchain, that is, the relay end has accounts in both the first blockchain and the second blockchain. Or, the relay end can be a forwarding apparatus connected to both the first blockchain and the second blockchain and is used for only forwarding data but not verifying data. Or, the relay end can be a trusted node, which can verify data after receiving the data from the first blockchain and send the data to the second blockchain after the verification succeeds. Or, the relay end can be a verification blockchain, which can perform consensus verification on data received from the first blockchain and then send the data to the second blockchain.

In step S202, the first account initiates the first transaction used for cross-chain resource transmission, to decrement the first resource balance of the first account by the first quantity and save the first data obtained through the consensus into the first blockchain based on the execution of the first transaction. The first data includes the authenticable message, and the authenticable message includes at least the following fields satisfying the predetermined protocol: the sending blockchain identifier field, the sending account field, the receiving blockchain identifier field, the receiving account field, and the message content field. The sending blockchain identifier field, the sending account field, the receiving blockchain identifier field, the receiving account field, and the message content field respectively correspond to the following field values: the first blockchain identifier, the first account, the second blockchain identifier, the second account, and the first quantity.

The first account is a common account, namely, a user account. In an embodiment, the first transaction can be a transaction preconfigured in the first blockchain and used for cross-chain resource transmission. A data field of the transaction includes the authenticable message. As such, when a node (for example, an accounting node) in the blockchain executes the transaction, the node decrements the first resource balance of the first account by the first quantity and saves the first data obtained through the consensus into the first blockchain. For example, the first data can be the transaction itself, and therefore, the first data can include the authenticable message. Understandably, the first data can be a transaction in the blockchain, or a receipt, or a state on a state tree, or any data in a smart contract storage or a relational database, etc. The data is saved into the blockchain after a consensus is reached by nodes, and therefore, the data is consistent on the nodes and can be verified.

In an embodiment, the first transaction includes invoking of a first smart contract, and the first transaction introduces at least the following parameters into the first smart contract when invoking the first smart contract: the second blockchain identifier, the second account, and the first quantity. Saving the first data obtained through the consensus into the first blockchain includes saving the first data obtained through the consensus into the first blockchain through execution of the first smart contract. In an embodiment, the first transaction includes invoking of a second smart contract, the first transaction introduces at least the following parameters into the second smart contract when invoking the second smart contract: the second blockchain identifier, the second account, and the first quantity. The second smart contract includes invoking of the first smart contract, and the second smart contract introduces at least the following parameters into the first smart contract when invoking the first smart contract: the first account, the second blockchain identifier, the second account, and the first quantity. Decrementing the first resource balance of the first account by the first quantity includes decrementing the first resource balance of the first account by the first quantity through execution of the second smart contract. In addition, through execution of the second smart contract, the following parameters are introduced into the first smart contract invoked by the second smart contract: the second blockchain identifier, the second account, and the first quantity.

For example, the first smart contract includes a save function "Save( )" during execution, and parameters introduced by the save function are the parameters introduced by the first smart contract. For example, the second smart contract introduces at least the following parameters into the first smart contract when invoking the first smart contract: the first account, the second blockchain identifier, the second account, and the first quantity. As such, the parameters (the first account, the second blockchain identifier, the second account, and the first quantity) introduced by the save function and a preconfigured blockchain identifier of the first blockchain form the authenticable message in a predetermined format (namely, the predetermined protocol), and are output as a function result, so that the function result is saved into a corresponding log. The log is included in a transaction receipt of the first transaction, and the transaction receipt is saved into blocks of the first blockchain through consensus verification by nodes in the first blockchain. In other words, in some embodiments, the first data is a receipt of the blockchain, and a specific log in the receipt includes the authenticable message. In the blocks of the blockchain, for example, the receipt can be identified by using any of the following as a predetermined flag: a specific transaction identifier of the first transaction, a contract identifier of the first smart contract, a contract identifier of the second smart contract, etc. In an embodiment, a specific topic (name) is further set in the log as the predetermined flag, which is used for subsequent searching of the receipt and log. Understandably, when the first data is a receipt, a flag can be predetermined for the first data to facilitate subsequent searching. However, the first data is not limited to a receipt. For example, the first data can be data stored in a smart contract storage, or data stored in a relational database, etc. In this case, a predetermined flag may not be labeled and the first data can be directly obtained from the specific database (or storage).

Figure 3:
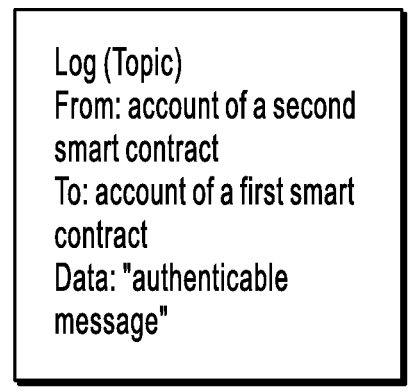
FIG. 3 is a schematic diagram illustrating a log generated after a first smart contract is executed.

For example, a log shown in FIG. 3 is generated after the second smart contract invokes the first smart contract to execute the first smart contract. FIG. 3 is a schematic diagram illustrating a log generated after the first smart contract is executed. As shown in FIG. 3, a log ("Log") has a predetermined topic ("Topic"). For example, the topic can be preconfigured as "AM", to indicate that the log is a log used to send an AM out of a chain. The log includes a "To" field, a "From" field, and a "Data" field. The "To" field corresponds to an account of an invoked contract, that is, an account of the first smart contract. The "From" field corresponds to an account of a contract that initiates invoking, that is, an account of the second smart contract. The "Data" field is the authenticable message. The authenticable message includes at least the following fields satisfying the predetermined protocol: the sending blockchain identifier (the first blockchain identifier) field, the sending account (the first account) field, the receiving blockchain identifier (the second blockchain identifier) field, the receiving account (the second account) field, and the message content (the first quantity) field.

Figure 4:
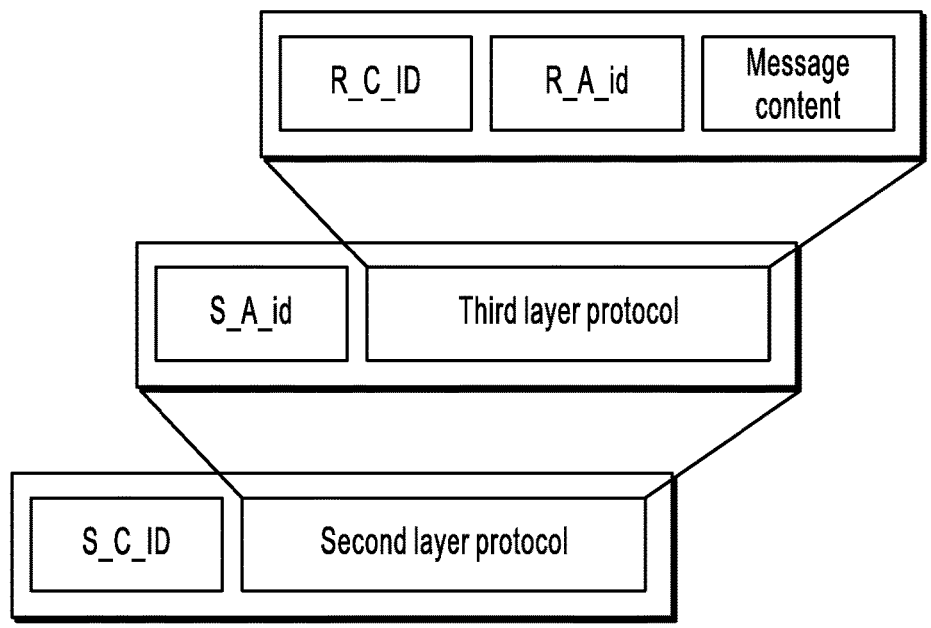
FIG. 4 is a schematic diagram illustrating a predetermined protocol stack, according to an embodiment of the present disclosure.

In an embodiment, the authenticable message satisfies a predetermined protocol stack. FIG. 4 is a schematic diagram illustrating a predetermined protocol stack, according to an embodiment of the present disclosure. As shown in FIG. 4, the lowest layer in the figure is a first layer protocol according to the some embodiments of the present disclosure, and the first layer protocol includes the sending blockchain identifier field (S_C_ID) and a second layer protocol. An intermediate layer in the figure is the second layer protocol, and the second layer protocol includes the sending account field (S_A_id) and a third layer protocol. The uppermost layer in the figure is the third layer protocol, and the third layer protocol includes the receiving blockchain identifier field (R_C_ID), the receiving account field (R_A_id), and the message content field. Understandably, a sending account can be an account in a sending blockchain, and a receiving account can be an account in a receiving blockchain.

Figure 5:
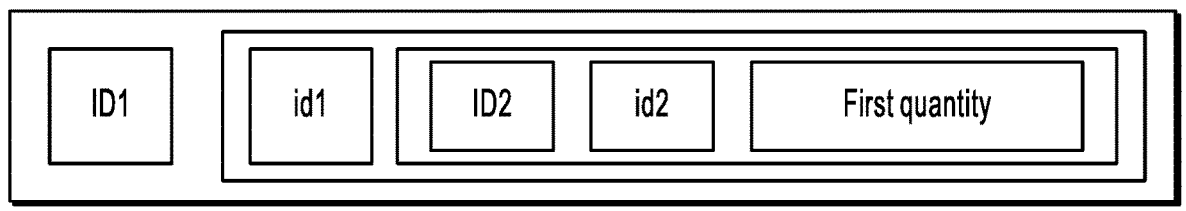
FIG. 5 illustrates a schematic form of an authenticable message.

For example, as described above, the authenticable message is a message saved into the first blockchain when the first account in the first blockchain sends a resource to the second account in the second blockchain. In one example, the blockchain identifier of the first blockchain is ID1, the first account is id1, the blockchain identifier of the second blockchain is ID2, and the second account is id2. In this case, FIG. 5 illustrates a schematic form of an authenticable message. As shown in FIG. 5, based on the protocol stack shown in FIG. 4, the first layer protocol includes ID1 and the second layer protocol, the second layer protocol includes id1 and the third layer protocol, and the third layer protocol includes ID2, id2, and the first quantity.

The protocol stack is designed based on an authentication process of the authenticable message. The first layer protocol and the second layer protocol respectively correspond to authentication processes of the sending chain and the sending account. The third layer protocol corresponds to a communication process. With the protocol stack designed in such a way, the authenticable message can be verified hierarchically after it is received, and message content can be obtained after the verification succeeds. Therefore, each layer of protocol has specific authentication semantics thereof, to facilitate a process of hierarchical authentication.

For example, the first data can be a first receipt. After receiving the first receipt through the relay end, a verification node in the second blockchain verifies the authenticable message, including first verifying the sending blockchain identifier of the first layer protocol in the authenticable message. Verifying the sending blockchain identifier includes performing verification through a simple payment verification method (SPV method) based on the first receipt, a block header of each block, and an additionally obtained Merkle tree path associated with the first receipt in a first block. The first receipt comes from the first block in the first blockchain, and the Merkle tree path is obtained based on the first location information. In addition, the verification may further include verification on the sending account in the second layer protocol in the authenticable message. Specifically, it is verified based on a sending field in the first receipt that the first account is an account that sends the authenticable message.

In an embodiments, the first layer protocol further includes a protocol version number field and a reserved field, to allow for upgrade and extension of the protocol stack. The reserved field is a null field.

In an embodiment, the second layer protocol further includes a type field. The type field indicates a type of an application of the authenticable message, so that the protocol stack can be superimposed in each application. For example, for different applications (different types in the authenticable message), the message content field can correspond to different content and have different formats, etc. For example, in a transfer of the present disclosure, the type field can be set to "transfer type".

The third layer protocol further includes a sequence number field that indicates a sequence of multiple authenticable messages sent by the first account to the second account.

Figure 6:
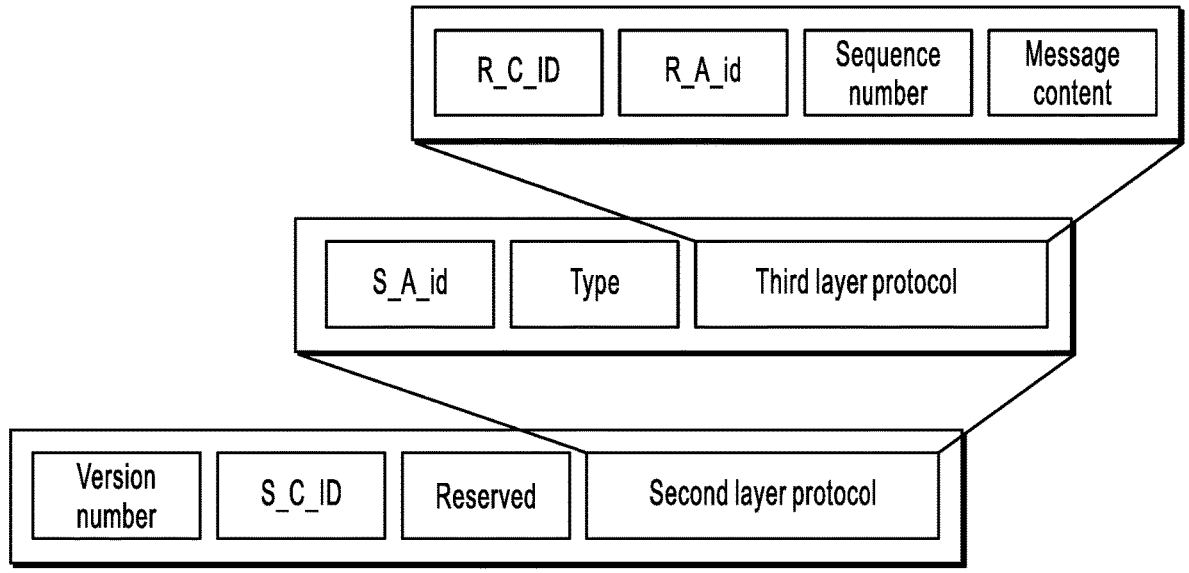
FIG. 6 is a schematic diagram illustrating a protocol stack with high applicability, according to an embodiment of the present disclosure.

FIG. 6 is a schematic diagram illustrating a protocol stack with high applicability, according to an embodiment of the present disclosure. As shown in FIG. 6, compared with the protocol stack shown in FIG. 4, a first layer protocol of the protocol stack further includes a version number field and a reserved field. A second layer protocol of the protocol stack further includes a type field. A third layer protocol of the protocol stack further includes a sequence number field. As described above, the protocol stack is upgradable and extensible, can be used for multiple scenario types, and can enable multiple times of communication. Therefore, the protocol stack has high applicability.

Figure 7:
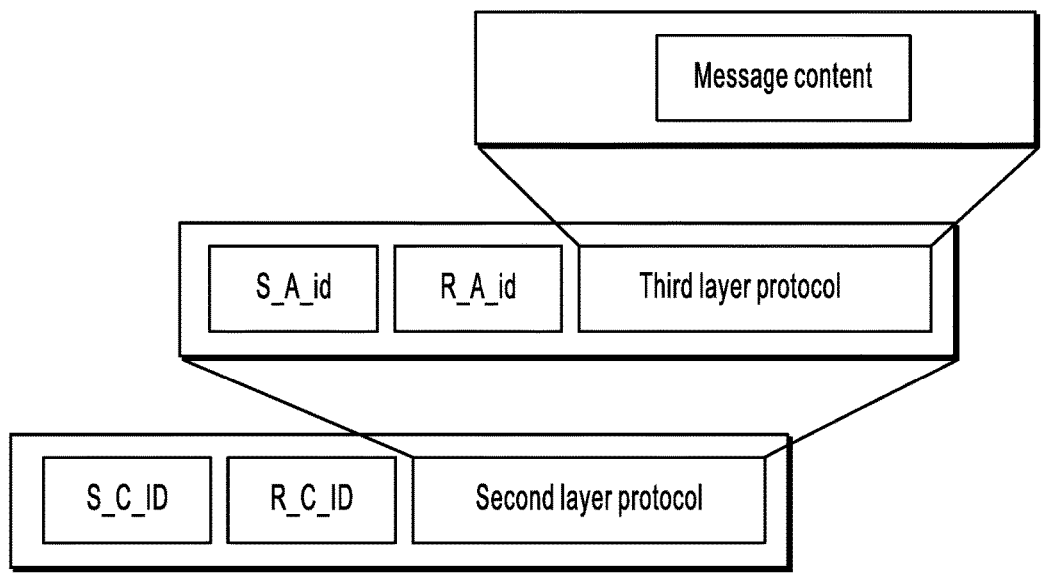
FIG. 7 is a schematic diagram illustrating another predetermined protocol stack, according to an embodiment of the present disclosure.

FIG. 7 is a schematic diagram illustrating another predetermined protocol stack, according to an embodiment of the present disclosure. As shown in FIG. 7, the lowest layer in the figure is a first layer protocol according to the embodiments of the present disclosure, and the first layer protocol includes the sending blockchain identifier field (S_C_ID), the receiving blockchain identifier field (R_C_ID), and a second layer protocol. An intermediate layer in the figure is the second layer protocol, and the second layer protocol includes the sending account field (S_A_id), the receiving account field (R_A_id), and a third layer protocol. The uppermost layer in the figure is the third layer protocol, and the third layer protocol includes the message content field. Understandably, a sending account can be an account in a sending blockchain, and a receiving account can be an account in a receiving blockchain.

Figure 8:
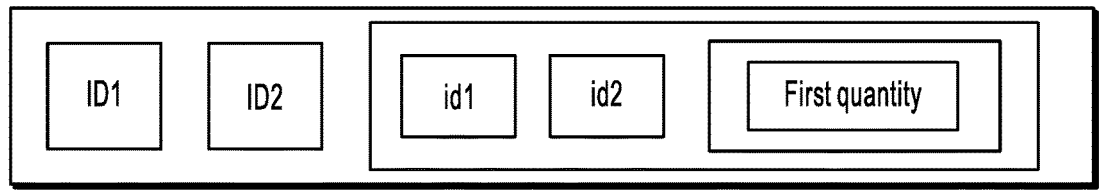
FIG. 8 illustrates a schematic form of an authenticable message.

For example, as described above, the authenticable message is a message saved into the first blockchain when the first account in the first blockchain sends a resource to the second account in the second blockchain. In one example, the blockchain identifier of the first blockchain is ID1, the first account is id1, the blockchain identifier of the second blockchain is ID2, and the second account is id2. In this case, FIG. 8 illustrates a schematic form of an authenticable message. As shown in FIG. 8, based on the protocol stack shown in FIG. 7, the first layer protocol includes ID1, ID2, and the second layer protocol, the second layer protocol includes id1, id2, and the third layer protocol, and the third layer protocol includes the message content (the first quantity).

The protocol stack is designed based on a transmission process of the authenticable message. The first layer protocol corresponds to transmission between the first blockchain and the second blockchain. The second layer protocol corresponds to transmission between the first account and the second account. The third layer protocol corresponds to a process that is based on the message content and that follows the transmission to the second account. With the protocol stack designed in such a way, the authenticable message can be read hierarchically from outside in during the transmission process of the authenticable message. To be specific, ID2 in the first layer protocol is first read, so as to first transmit the authenticable message to the second blockchain. Subsequently, id2 in the second layer protocol is read, so as to transfer a corresponding resource to the second account.

In an embodiment, the first layer protocol further includes a protocol version number field and a reserved field, to allow for upgrade and extension of the protocol stack. The reserved field is a null field.

In an embodiment, the third layer protocol further includes a type field. The type field indicates a type of an application of the authenticable message, so that the protocol stack can be superimposed in each application. The third layer protocol further includes a sequence number field that indicates a sequence of multiple authenticable messages sent by the first account to the second account.

Field values respectively corresponding to the protocol version number field, the reserved field, the type field, the sequence number field, etc. can be similarly transferred to the first smart contract as input parameters when the first smart contract is invoked. As such, based on these input parameters, the first smart contract can input an authenticable message that includes these field values.

Figure 9:
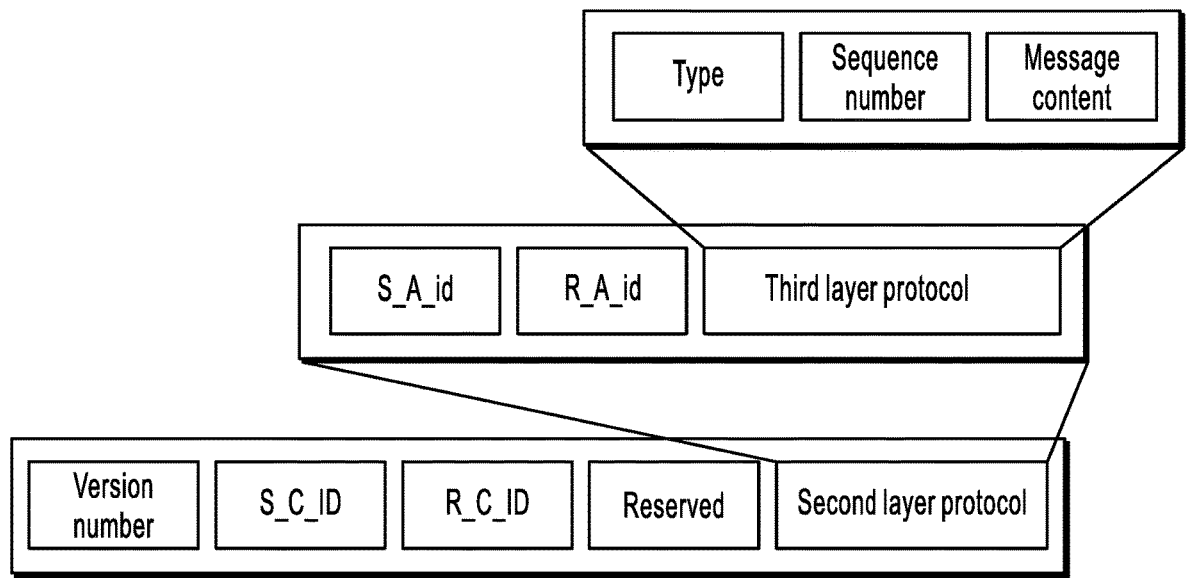
FIG. 9 is a schematic diagram illustrating a protocol stack with high applicability, according to an embodiment of the present disclosure.

FIG. 9 is a schematic diagram illustrating a protocol stack with high applicability, according to an embodiment of the present disclosure. As shown in FIG. 9, compared with the protocol stack shown in FIG. 7, a first layer protocol of the protocol stack further includes a version number field and a reserved field. A third layer protocol of the protocol stack further includes a type field and a sequence number field. As described above, the protocol stack is upgradable and extensible, can be used for multiple scenario types, and can enable multiple times of communication. Therefore, the protocol stack has high applicability.

After the first resource balance of the first account of the first blockchain is decremented by the first quantity, a first blockchain platform sends the first quantity of first resources to a second blockchain platform based on a predetermined protocol agreed on with the second blockchain.

In step S204, the first data and the first location information are provided to the relay end, to send the authenticable message to the second blockchain, so that a second resource balance of the second account is incremented by a second quantity. The second quantity is calculated based on the first quantity and a conversion ratio between the first resource and the second resource, and the first location information indicates a location of the first data in the first blockchain.

Figure 10:
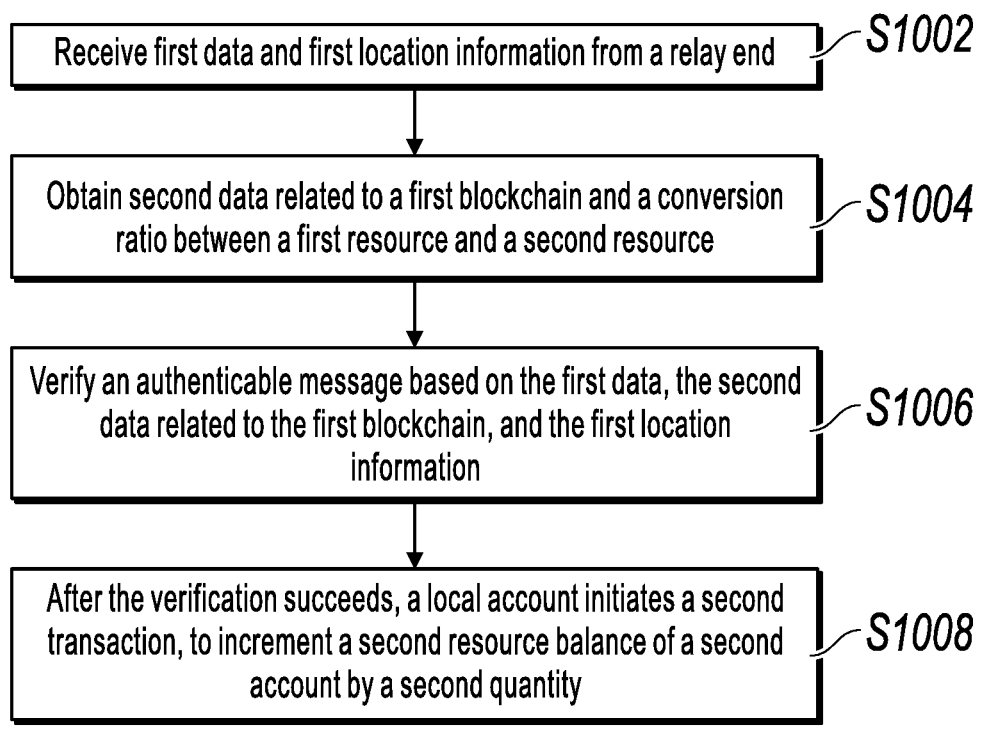
FIG. 10 is a schematic flowchart illustrating a method for cross-chain resource reception, according to an embodiment of the present disclosure.

As described above, in some embodiments of the present disclosure, different relay ends can be used. Based on different embodiments of the relay end, different methods can be used to provide the first data to the relay end. For example, the relay end can be a node in both the first blockchain and the second blockchain. Therefore, the relay end can obtain the first data from locally stored data (for example, a block or a state tree), and obtain the first location data at the same time. The first location information indicates the location of the first data in the blockchain. For example, when the first data is a receipt, the first location information includes a serial number of a block of the receipt, a serial number of the receipt in the block, etc. For example, the relay end is a forwarding apparatus connected to both the first blockchain and the second blockchain. As such, any node of the first blockchain can locally obtain the first data and its location information based on a request of the relay end, and send the first data and its location information to the relay end. After obtaining the first data and its location information, the relay end can execute different steps based on a difference of its own form, to provide the authenticable message in the first data for the second blockchain. FIG. 10 is a schematic flowchart illustrating a method for cross-chain resource reception, according to an embodiment of the present disclosure. The cross-chain resource reception includes receiving by a second account of a second blockchain from another blockchain. The second blockchain is connected to a relay end, and the second blockchain synchronizes at least one piece of second data separately related to at least one another blockchain through the relay end. The at least one another blockchain includes a first blockchain, the first blockchain uses a first resource as an exchangeable resource, the second blockchain uses a second resource as an exchangeable resource. The method is executed by the second blockchain and includes the following steps:

Step S1002: Receive, from the relay end, first data and first location information, where the first data includes an authenticable message. The authenticable message includes at least the following fields satisfying a predetermined protocol: a sending blockchain identifier field, a sending account field, a receiving blockchain identifier field, a receiving account field, and a message content field. The sending blockchain identifier field, the sending account field, the receiving blockchain identifier field, the receiving account field, and the message content field respectively correspond to the following field values: a first blockchain identifier, a first account, a second blockchain identifier, the second account, and a first quantity, and the first location information indicates a location of the first data in a sending blockchain.

Step S1004: Obtain second data related to the first blockchain and a conversion ratio between the first resource and the second resource based on the first blockchain identifier in the authenticable message.

Step S1006: Verify the authenticable message based on the first data, the second data related to the first blockchain, and the first location information.

Step S1008: A local account initiates, based on the second account in the authenticable message after the verification succeeds, a second transaction used for cross-chain resource reception, to increment a second resource balance of the second account by a second quantity based on execution of the second transaction, where the second quantity is calculated based on the first quantity and the conversion ratio.

After the method shown in FIG. 2 is performed, the relay end obtains the first data and its location information that are saved by the first account into the first blockchain, and forwards the first data and its location information to any node in the second blockchain. The node then spreads the first data and its location information in the second blockchain. In the second blockchain, for example, the authenticable message is verified on multiple verification nodes. The verification nodes synchronize second data separately related to each of other blockchains by using the relay end, and the second data is used to verify the authenticable message. The verification node varies with a specific verification method, and the second data varies accordingly. For example, when a simple payment verification (SPV) method is used for verification, the verification node is a SPV node, and the second data is a block header of each block in a corresponding chain.

In step S1002, the first data and the first location information are first received from the relay end. The first data includes the authenticable message. The authenticable message includes at least the following fields satisfying the predetermined protocol: the sending blockchain identifier field, the sending account field, the receiving blockchain identifier field, the receiving account field, and the message content field. The sending blockchain identifier field, the sending account field, the receiving blockchain identifier field, the receiving account field, and the message content field respectively correspond to the following field values: the first blockchain identifier, the first account, the second blockchain identifier, the second account, and the first quantity, and the first location information indicates the location of the first data in the sending blockchain.

As described above, the first data is, for example, a receipt that has a predetermined flag and that is obtained from a block of the first blockchain through the relay end. After obtaining the receipt and its location from the first blockchain, the relay end can forward the receipt and its location to the second blockchain, so that each node in the second blockchain can obtain the receipt and its location. As such, an accounting node, or a verification node, etc. in the second blockchain can perform the following steps S1004 to S1008.

In step S1004, the second data related to the first blockchain and the conversion ratio between the first resource and the second resource are obtained based on the first blockchain identifier in the authenticable message.

As described above, the authenticable message includes the first blockchain identifier. Therefore, after the first data is received, the first blockchain identifier can be obtained from the sending blockchain identifier field in the authenticable message in the first data, so as to locally obtain the second data related to the first blockchain. After it is determined that the sending blockchain is the first blockchain, it can be determined that the first blockchain uses the first resource as an exchangeable resource. As such, the conversion ratio between the first resource and the second resource can be locally obtained, to calculate the second quantity corresponding to the first quantity.

In step S1006, the authenticable message is verified based on the first data, the second data related to the first blockchain, and the first location information.

In an embodiment, the first data is a first receipt in a first block of the first blockchain, the first location information includes a block serial number of the first block and a receipt serial number of the first receipt in the first block. The second data related to the first blockchain is a block header of each block in the first blockchain. Verifying the authenticable message based on the first data, the second data related to the first blockchain, and the first location information includes performing verification through a simple payment verification method (SPV method) based on the first receipt, the block header of each block, and an additionally obtained Merkle tree path associated with the first receipt in the first block. The first receipt comes from the first block in the first blockchain, and the Merkle tree path is obtained based on the first location information. The SPV method includes the following steps: calculating a receipt hash value of the first receipt; calculating a root hash value of a Merkle tree based on the Merkle tree path; and comparing the calculated root hash value with a root hash value of a receipt tree in a block header of the first block, to determine whether the first receipt is in the first block.

In an embodiment, the SPV can further include the following: after determining that the first receipt is in the first block, based on a location of the first block, verifying whether the block header of the block is included in a known longest chain, to determine whether a consensus has been reached for the first block. In an embodiment, the blockchain identifier corresponds to a header hash value of a Genesis block of a blockchain. The SPV can further include the following: by using the block header of each block and a header hash value and a parent hash value in the block header of the first block, verifying whether a header hash value of a Genesis block of the blockchain corresponds to the blockchain identifier of the first blockchain.

In an embodiment, the first receipt is saved into a blockchain by the first account by sending a transaction. Therefore, based on a sending field in the first receipt, it can be verified whether the first account is an account that sends the authenticable message.

In step S1008, the local account initiates, based on the second account in the authenticable message after the verification succeeds, the second transaction used for cross-chain resource reception, to increment the second resource balance of the second account by the second quantity based on execution of the second transaction. The second quantity is calculated based on the first quantity and the conversion ratio.

In an embodiment, the second transaction invokes a third smart contract. Incrementing the second resource balance of the second account by the second quantity based on execution of the second transaction includes incrementing the second resource balance of the second account by the second quantity based on execution of the third smart contract. Understandably, the second transaction is not limited to invoking the third smart contract to implement transfer to the second account. For example, the second transaction can be a special transaction preconfigured in the second blockchain and used for cross-chain resource reception. As such, a node (for example, an accounting node) can increment the second resource balance of the second account by the second quantity when executing the second transaction. The second quantity is calculated based on the first quantity and the conversion ratio. In other words, the first quantity of first resources is equivalent to the second quantity of second resources.

Figure 11:
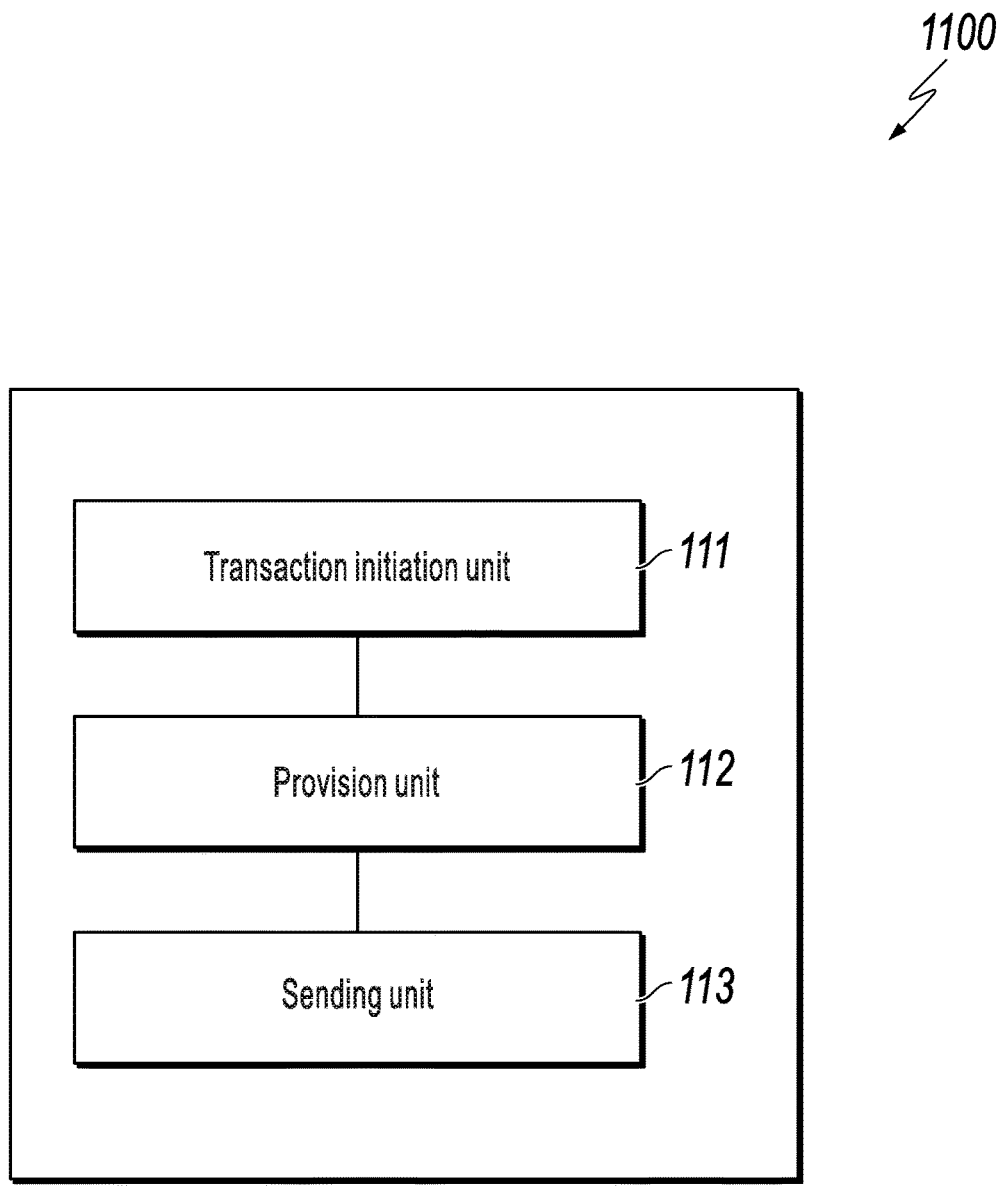
FIG. 11 illustrates an apparatus 1100 for cross-chain resource transmission, according to an embodiment of the present disclosure.

FIG. 11 illustrates an apparatus 1100 for cross-chain resource transmission, according to an embodiment of the present disclosure. The cross-chain resource transmission includes sending from a first account of a first blockchain to another blockchain. The first blockchain is connected to a relay end, the relay end is further connected to at least one another blockchain. The at least one another blockchain includes a second blockchain. The first blockchain uses a first resource as an exchangeable resource. The second blockchain uses a second resource as an exchangeable resource. The apparatus is deployed in the first blockchain and includes the following: a transaction initiation unit 111, configured to enable the first account to initiate a first transaction used for cross-chain resource transmission, to decrement a first resource balance of the first account by a first quantity and save first data obtained through a consensus into the first blockchain based on execution of the first transaction, where the first data includes an authenticable message, and where the authenticable message includes at least the following fields satisfying a predetermined protocol: a sending blockchain identifier field, a sending account field, a receiving blockchain identifier field, a receiving account field, and a message content field, where the sending blockchain identifier field, the sending account field, the receiving blockchain identifier field, the receiving account field, and the message content field respectively correspond to the following field values: a first blockchain identifier, the first account, a second blockchain identifier, a second account, and the first quantity; and a provision unit 112, configured to send the first data and first location information to the relay end, which is used to send the authenticable message to the second blockchain, where a second resource balance of the second account is incremented by a second quantity, where the second quantity is calculated based on the first quantity and a conversion ratio between the first resource and the second resource, and where the first location information indicates a location of the first data in the first blockchain.

In an embodiment, the first transaction includes invoking of a first smart contract. The first transaction introduces at least the following parameters into the first smart contract when invoking the first smart contract: the second blockchain identifier, the second account, and the first quantity. The transaction initiation unit 111 is further configured to save the first data obtained through the consensus into the first blockchain through execution of the first smart contract.

In an embodiment, the first transaction includes invoking of a second smart contract. The first transaction introduces at least the following parameters into the second smart contract when invoking the second smart contract: the second blockchain identifier, the second account, and the first quantity. The second smart contract includes invoking of the first smart contract. The second smart contract introduces at least the following parameters into the first smart contract when invoking the first smart contract: the first account, the second blockchain identifier, the second account, and the first quantity. The transaction initiation unit 111 is further configured to decrement the first resource balance of the first account by the first quantity through execution of the second smart contract.

In an embodiment, the apparatus further includes a sending unit 113, configured to enable, after the first resource balance of the first account is decremented by the first quantity, a first blockchain platform to send the first quantity of first resources to a second blockchain platform based on a predetermined protocol agreed on with the second blockchain.

Figure 12:
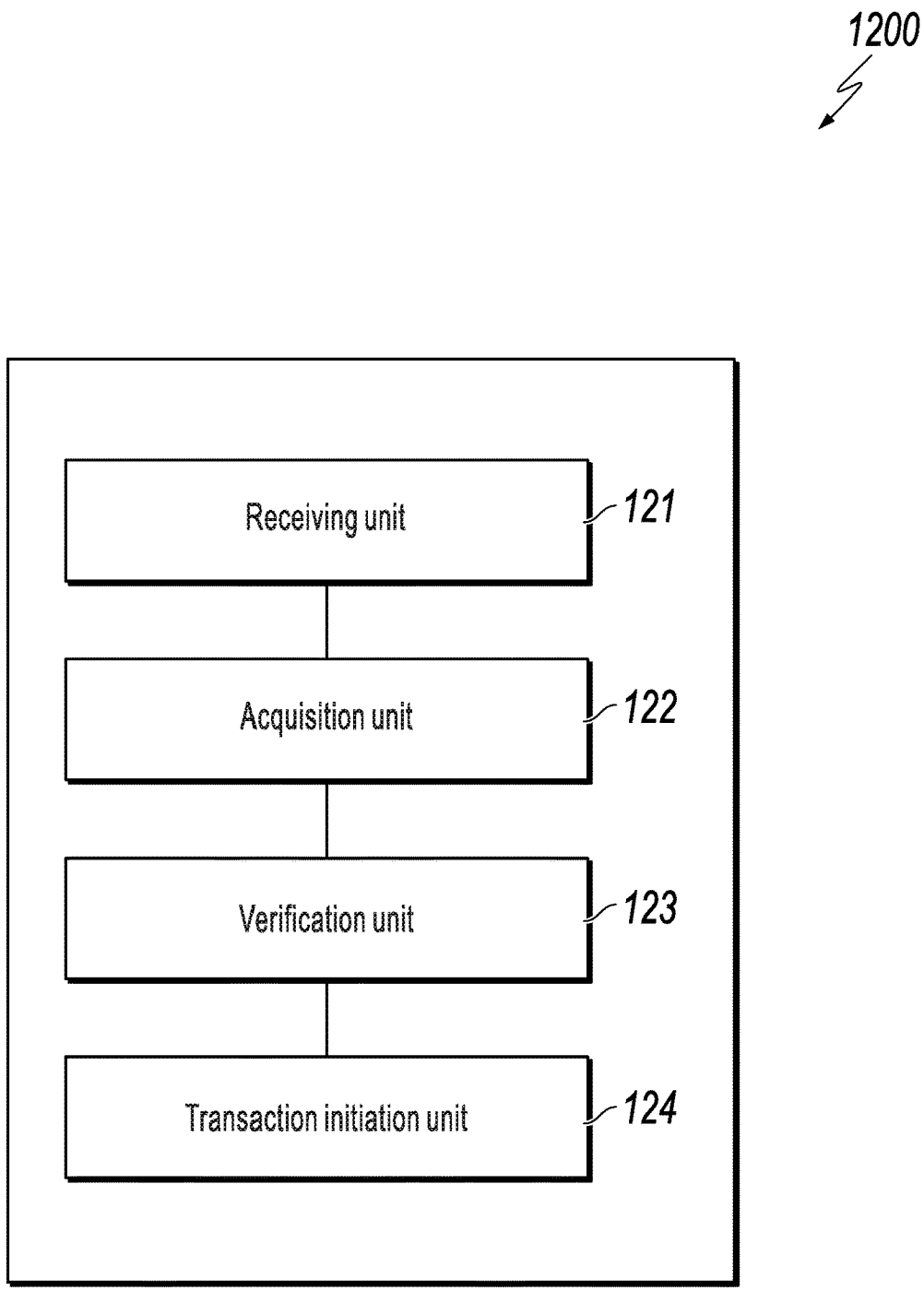
FIG. 12 illustrates an apparatus 1200 for cross-chain resource reception, according to an embodiment of the present disclosure.

FIG. 12 illustrates an apparatus 1200 for cross-chain resource reception, according to an embodiment of the present disclosure. The cross-chain reception includes receiving by a second account of a second blockchain from another blockchain. The second blockchain is connected to a relay end. The second blockchain synchronizes at least one piece of second data separately related to at least one another blockchain through the relay end. The at least one another blockchain includes a first blockchain, the first blockchain uses a first resource as an exchangeable resource. The second blockchain uses a second resource as an exchangeable resource. The apparatus is deployed in the second blockchain and includes the following: a receiving unit 121, configured to receive, from the relay end, first data and first location information, where the first data includes an authenticable message, the authenticable message includes at least the following fields satisfying a predetermined protocol: a sending blockchain identifier field, a sending account field, a receiving blockchain identifier field, a receiving account field, and a message content field, where the sending blockchain identifier field, the sending account field, the receiving blockchain identifier field, the receiving account field, and the message content field respectively correspond to the following field values: a first blockchain identifier, a first account, a second blockchain identifier, the second account, and a first quantity, and where the first location information indicates a location of the first data in a sending blockchain; an acquisition unit 122, configured to obtain second data related to the first blockchain and a conversion ratio between the first resource and the second resource based on the first blockchain identifier in the authenticable message; a verification unit 123, configured to verify the authenticable message based on the first data, the second data related to the first blockchain, and the first location information; and a transaction initiation unit 124, configured to enable, based on the second account in the authenticable message after the verification succeeds, a local account to initiate a second transaction used for cross-chain resource reception, to increment a second resource balance of the second account by a second quantity based on execution of the second transaction, where the second quantity is calculated based on the first quantity and the conversion ratio.

In an embodiment, the first data is a first receipt in a first block of the first blockchain. The first location information includes a block serial number of the first block and a receipt serial number of the first receipt in the first block. The second data related to the first blockchain is a block header of each block in the first blockchain. The verification unit 123 is further configured to perform verification through a simple payment verification method based on the first receipt, the block header of each block, and a Merkle tree path associated with the first receipt in the first block. The first receipt comes from the first block in the first blockchain. The Merkle tree path is obtained based on the first location information.

In an embodiment, the verification unit 123 is further configured to verify, based on a sending field of the first receipt, that the first account is an account that sends the authenticable message.

In an embodiment, the second transaction invokes a third smart contract. The transaction initiation unit 124 is further configured to increment the second resource balance of the second account by the second quantity based on execution of the third smart contract.

Another aspect of the present disclosure provides a computer-readable storage medium. The computer-readable storage medium stores a computer program, and when the computer program is run on a computer, the computer is enabled to perform the method according to any one of the preceding embodiments.

Another aspect of the present disclosure provides a computing device, including a memory and a processor. The memory stores executable code, and when executing the executable code, the processor implements the method according to any one of the preceding embodiments.

According to an abstract blockchain interoperability model in the cross-chain solutions in the embodiments of the present disclosure, an authenticable message is designed, so that a message sent by a blockchain can be authenticated by another chain, that is, it can be determined which chain the message is from and which identity entity (account/contract) on the chain sends the message. As such, cross-chain resource circulation can be allowed based on the authenticable message, and the authenticable message can maintain relatively high extensibility, support superimposed protocol stacks, and standardize various cross-chain interoperability technologies and applications. In addition, the authenticable message can be implemented by a heterogeneous platform, so that a blockchain can implement only one type of cross-chain adaptive upgrade, access multiple cross-chain platforms, and connect to multiple chains.

It should be understood that the descriptions such as "first" and "second" in the present disclosure are only used to distinguish between similar concepts for simplicity of description, and have no other limiting effects.

The embodiments in the present disclosure are described in a progressive way. For same or similar parts of the embodiments, references can be made to the embodiments mutually. Each embodiment focuses on a difference from other embodiments. Particularly, a system embodiment is similar to a method embodiment, and therefore is described briefly. For related parts, references can be made to related descriptions in the method embodiment.

Specific embodiments of the present disclosure are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some embodiments, multi-tasking and concurrent processing is feasible or can be advantageous.

A person of ordinary skill in the art can be further aware that, in combination with the examples described in the embodiments disclosed in the present disclosure, units and algorithm steps can be implemented by electronic hardware, computer software, or a combination thereof. To clearly describe interchangeability between the hardware and the software, compositions and steps of each example are generally described above based on functions. Whether the functions are performed by hardware or software depends on particular applications and design constraint conditions of the technical solutions. A person of ordinary skill in the art can use different methods to implement the described functions for each particular application, but it should not be considered that the embodiment goes beyond the scope of the present application.

Steps of methods or algorithms described in the embodiments disclosed in the present disclosure can be implemented by hardware, a software module executed by a processor, or a combination thereof. The software module can reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the described embodiments, the objective, technical solutions, and benefits of the present disclosure are further described in detail. It should be understood that the descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

The invention claimed is:

1. A computer-implemented method comprising:

initiating, by one or more processors of a first blockchain, a first transaction for a transfer from a first account of the first blockchain to a second account of a second blockchain;

decrementing, by the one or more processors of the first blockchain, a first exchangeable resource balance of the first account of the first blockchain by a first quantity based on the first transaction;

based on the first transaction, identifying, by the one or more processors of the first blockchain, a plurality of field values, wherein the plurality of field values comprises:
   a sending blockchain identifier field value corresponding to the first blockchain;
   a sending account field value corresponding to the first account of the first blockchain;
   a receiving blockchain identifier field value corresponding to the second blockchain;
   a receiving account field value corresponding to a second account of the second blockchain; and
   a message content field value corresponding to the first quantity;

transferring, by the one or more processors of the first blockchain and to a first smart contract, input parameters including the plurality of field values;

generating, by the one or more processors of the first blockchain, an authenticable message in a predetermined protocol stack to facilitate a process of hierarchical authentication by invoking the first smart contract based on the first transaction, wherein invoking the first smart contract comprises:
   generating a first layer of the authenticable message, wherein the first layer comprises the sending blockchain identifier field value and a second layer of the authenticable message, and wherein the first layer satisfies a first layer protocol of a layered protocol of the predetermined protocol stack for the authenticable message to be verified hierarchically;
   generating the second layer of the authenticable message, wherein the second layer comprises the sending account field value and a third layer of the authenticable message, and wherein the second layer satisfies a second layer protocol of the layered protocol of the predetermined protocol stack;
   generating the third layer of the authenticable message, wherein the third layer comprises the receiving blockchain identifier field value, the receiving account field value, and the message content field value, wherein the third layer satisfies a third layer protocol of the layered protocol of the predetermined protocol stack; and
   saving the authenticable message in one or more blocks of the first blockchain; and sending, by the one or more processors of the first blockchain, the authenticable message to the second blockchain through a relay end, wherein the relay end is connected to the first blockchain and to the second blockchain.

2. The computer-implemented method of claim 1, wherein the relay end is a node of the first blockchain, and the method further comprises:

after receiving the authenticable message, verifying, by the relay end, the authenticable message; and subsequent to verifying the authenticable message, sending, by the relay end, the authenticable message to the second blockchain.

3. The computer-implemented method of claim 2, the method comprising:
invoking, by the one or more processors of the first blockchain, a second smart contract,
wherein invoking the first smart contract comprises invoking the first smart contract via the invoked second smart contract, and
wherein the decrementing the first exchangeable resource balance of the first account by the first quantity comprises decrementing the first exchangeable resource balance of the first account by the first quantity via the invoked second smart contract.

4. The computer-implemented method of claim 1, wherein saving the authenticable message in the one or more blocks of the first blockchain comprises saving first data in the one or more blocks of the first blockchain, wherein the first data including the authenticable message is labeled with a predetermined flag.

5. The computer-implemented method of claim 1, wherein saving the authenticable message comprises saving the authenticable message in a data field of a log of the first blockchain, wherein the log is included in a transaction receipt of the first transaction, wherein the transaction receipt of the first transaction is saved into the one or more blocks of the first blockchain through consensus verification by the first blockchain.

6. The computer-implemented method of claim 1, wherein the first layer protocol further comprises a protocol version number field and a reserved field.

7. The computer-implemented method of claim 1, wherein the second layer protocol further comprises a type field, wherein the type field indicates a type of an application of the authenticable message.

8. The computer-implemented method of claim 1, wherein the third layer protocol further comprises a sequence number field that indicates a current sending sequence number when the first account sends resources to the second account for multiple times.

9. The computer-implemented method of claim 1, further comprising:
after decrementing the first exchangeable resource balance of the first account by the first quantity, sending, by the one or more processors of the first blockchain, a first quantity of first exchangeable resources to the second blockchain based on an agreed-upon predetermined protocol between the first blockchain and the second blockchain.

10. The computer-implemented method of claim 1, wherein a second exchangeable resource balance of the second account of the second blockchain is incremented by a second quantity, wherein a value of the second quantity is based on the first quantity and a conversion ratio between a first exchangeable resource and a second exchangeable resource.

11. A non-transitory, computer-readable medium storing one or more instructions that, when executed by one or more processors, cause the one or more processors to perform operations comprising:

initiating a first transaction for a transfer from a first account of a first blockchain to a second account of a second blockchain;

decrementing a first exchangeable resource balance of the first account of the first blockchain by a first quantity based on the first transaction;

based on the first transaction, identifying a plurality of field values, wherein the plurality of field values comprises:
  a sending blockchain identifier field value corresponding to the first blockchain;
  a sending account field value corresponding to the first account of the first blockchain;
  a receiving blockchain identifier field value corresponding to the second blockchain;
  a receiving account field value corresponding to a second account of the second blockchain; and
  a message content field value corresponding to the first quantity;
transferring, to a first smart contract, input parameters including the plurality of field values;
generating an authenticable message in a predetermined protocol stack to facilitate a process of hierarchical authentication by invoking the first smart contract based on the first transaction, wherein invoking the first smart contract further comprises:
  generating a first layer of the authenticable message, wherein the first layer comprises the sending blockchain identifier field value and a second layer of the authenticable message, and wherein the first layer satisfies a first layer protocol of a layered protocol of the predetermined protocol stack for the authenticable message to be verified hierarchically;
  generating the second layer of the authenticable message, wherein the second layer comprises the sending account field value and a third layer of the authenticable message, and wherein the second layer satisfies a second layer protocol of the layered protocol of the predetermined protocol stack;
  generating the third layer of the authenticable message, wherein the third layer comprises the receiving blockchain identifier field value, the receiving account field value, and the message content field value, wherein the third layer satisfies a third layer protocol of the layered protocol of the predetermined protocol stack; and
  saving the authenticable message in one or more blocks of the first blockchain; and
sending the authenticable message to the second blockchain through a relay end, wherein the relay end is connected to the first blockchain and to the second blockchain.

12. The non-transitory, computer-readable medium of claim 11, wherein the relay end is a node of the first blockchain, and wherein the one or more instructions, when executed by the one or more processors, further cause the one or more processors to perform additional operations comprising:
  after receiving the authenticable message, verifying the authenticable message; and
  subsequent to verifying the authenticable message, sending the authenticable
  message to the second blockchain.

13. The non-transitory, computer-readable medium of claim 11, wherein the one or more instructions, when executed by the one or more processors, further cause the one or more processors to perform additional operations comprising:
  after decrementing the first exchangeable resource balance of the first account by the first quantity, sending a first quantity of first exchangeable resources to the second blockchain based on an agreed-upon predetermined protocol between the first blockchain and the second blockchain.

14. The non-transitory, computer-readable medium of claim 11, wherein a second exchangeable resource balance of the second account of the second blockchain is incremented by a second quantity, wherein a value of the second quantity is based on the first quantity and a conversion ratio between a first exchangeable resource and a second exchangeable resource.

15. A computer-implemented system, comprising:
  one or more processors; and
  one or more computer memory devices interoperably coupled with the one or more processors, the one or more computer memory devices having tangible, non-transitory, machine-readable media storing one or more instructions that, when executed by the one or more processors, perform one or more operations comprising:
    initiating a first transaction for a transfer from a first account of a first blockchain to a second account of a second blockchain;
    decrementing a first exchangeable resource balance of the first account of the first blockchain by a first quantity based on the first transaction;
    based on the first transaction, identifying a plurality of field values, wherein the plurality of field values comprises:
      a sending blockchain identifier field value corresponding to the first blockchain;
      a sending account field value corresponding to the first account of the first blockchain;
      a receiving blockchain identifier field value corresponding to the second blockchain;
      a receiving account field value corresponding to a second account of the second blockchain; and
      a message content field value corresponding to the first quantity;
    transferring, to a first smart contract, input parameters including the plurality of field values;
    generating an authenticable message in a predetermined protocol stack to facilitate a process of hierarchical authentication by invoking the first smart contract based on the first transaction, wherein invoking the first smart contract further comprises:
      generating a first layer of the authenticable message, wherein the first layer comprises the sending blockchain identifier field value and a second layer of the authenticable message, and wherein the first layer satisfies a first layer protocol of a layered protocol of the predetermined protocol stack for the authenticable message to be verified hierarchically;
      generating the second layer of the authenticable message, wherein the second layer comprises the sending account field value and a third layer of the authenticable message, and wherein the second layer satisfies a second layer protocol of the layered protocol of the predetermined protocol stack;
      generating the third layer of the authenticable message, wherein the third layer comprises the receiving blockchain identifier field value, the receiving account field value, and the message content field value, wherein the third layer satisfies a third layer protocol of the layered protocol of the predetermined protocol stack; and
      saving he authenticable message in one or more blocks of the first blockchain; and sending the authenticable message to the second blockchain through a relay end, wherein the relay end is connected to the first blockchain and to the second blockchain.

16. The computer-implemented system of claim 15, wherein the relay end is a node of the first blockchain, and wherein the one or more instructions, when executed by the one or more processors, further cause the one or more processors to perform additional operations comprising:

after receiving the authenticable message, verifying the authenticable message; and subsequent to verifying the authenticable message, sending the authenticable message to the second blockchain.

17. The computer-implemented system of claim 16, wherein the one or more instructions, when executed by the one or more processors, further cause the one or more processors to perform the additional operations comprising:

invoking a second smart contract,
wherein invoking the first smart contract comprises invoking the first smart contract via the invoked second smart contract, and
wherein the decrementing the first exchangeable resource balance of the first account by the first quantity comprises decrementing the first exchangeable resource balance of the first account by the first quantity via the invoked second smart contract.

18. The computer-implemented system of claim 15, wherein the one or more instructions, when executed by the one or more processors, further cause the one or more processors to perform additional operations comprising:

after decrementing the first exchangeable resource balance of the first account by the first quantity, sending a first quantity of first exchangeable resources to the second blockchain based on an agreed-upon predetermined protocol between the first blockchain and the second blockchain.

19. The computer-implemented system of claim 15, wherein a second exchangeable resource balance of the second account of the second blockchain is incremented by a second quantity, wherein a value of the second quantity is based on the first quantity and a conversion ratio between a first exchangeable resource and a second exchangeable resource.

* * * * *

UNITED STATES PATENT AND TRADEMARK OFFICE
CERTIFICATE OF CORRECTION

| | | |
|---|---|---|
| PATENT NO. | : 11,336,451 B2 | Page 1 of 1 |
| APPLICATION NO. | : 16/786764 | |
| DATED | : May 17, 2022 | |
| INVENTOR(S) | : Honglin Qiu | |

It is certified that error appears in the above-identified patent and that said Letters Patent is hereby corrected as shown below:

In the Claims

Column 22, Line 66, in Claim 15, delete "he" and insert -- the --.

Signed and Sealed this
Nineteenth Day of July, 2022

Katherine Kelly Vidal
*Director of the United States Patent and Trademark Office*